(12) United States Patent
Ramarao et al.

(10) Patent No.: US 8,370,309 B1
(45) Date of Patent: Feb. 5, 2013

(54) REVISION-TOLERANT DATA DE-DUPLICATION

(75) Inventors: Karempudi V. Ramarao, San Ramon, CA (US); Raj Kanaya, Belmont, CA (US)

(73) Assignee: Infineta Systems, Inc., San Jose, CA (US)

( * ) Notice: Subject to any disclaimer, the term of this patent is extended or adjusted under 35 U.S.C. 154(b) by 392 days.

(21) Appl. No.: 12/495,432

(22) Filed: Jun. 30, 2009

Related U.S. Application Data

(60) Provisional application No. 61/078,324, filed on Jul. 3, 2008, provisional application No. 61/092,740, filed on Aug. 28, 2008.

(51) Int. Cl.
*G06F 17/30* (2006.01)
(52) U.S. Cl. .......................... 707/664; 707/692; 707/693
(58) Field of Classification Search .................. 707/664, 707/692, 693
See application file for complete search history.

(56) References Cited

U.S. PATENT DOCUMENTS

| | | | |
|---|---|---|---|
| 6,667,700 B1 | 12/2003 | McCanne et al. | |
| 6,904,430 B1 | 6/2005 | Livshits | |
| 6,925,467 B2 | 8/2005 | Gu et al. | |
| 7,200,604 B2 | 4/2007 | Forman et al. | |
| 7,281,006 B2 | 10/2007 | Hsu et al. | |
| 7,305,532 B2 | 12/2007 | Zhu et al. | |
| 7,504,969 B2 | 3/2009 | Patterson et al. | |
| 7,523,098 B2 | 4/2009 | Hirsch | |
| 7,930,559 B1 | 4/2011 | Beaverson et al. | |
| 7,962,520 B2 | 6/2011 | Patterson et al. | |
| 2004/0139072 A1 | 7/2004 | Broder et al. | |
| 2004/0187075 A1 | 9/2004 | Maxham et al. | |
| 2004/0260694 A1 | 12/2004 | Chaudhuri et al. | |
| 2005/0131939 A1 | 6/2005 | Douglis et al. | |
| 2005/0210043 A1 | 9/2005 | Manasse | |
| 2006/0047855 A1 | 3/2006 | Gurevich et al. | |
| 2006/0059207 A1 | 3/2006 | Hirsch et al. | |
| 2006/0112148 A1 | 5/2006 | Jennings et al. | |
| 2007/0085716 A1 | 4/2007 | Bar-Yossef et al. | |
| 2008/0005141 A1 | 1/2008 | Zheng et al. | |
| 2008/0005201 A1 | 1/2008 | Ting et al. | |
| 2008/0010278 A1* | 1/2008 | Kencl et al. ....................... 707/6 |
| 2008/0098083 A1 | 4/2008 | Shergill et al. | |
| 2008/0144079 A1 | 6/2008 | Pandey et al. | |
| 2008/0244172 A1 | 10/2008 | Kano | |
| 2008/0256143 A1* | 10/2008 | Reddy et al. ................... 707/204 |
| 2009/0063528 A1 | 3/2009 | Yueh | |
| 2009/0063795 A1 | 3/2009 | Yueh | |
| 2009/0089483 A1 | 4/2009 | Tanaka et al. | |
| 2009/0193223 A1 | 7/2009 | Saliba et al. | |

OTHER PUBLICATIONS

Khu, Arthur; "Xilinx FPGA Configuration Data Compression and Decompression"; Sep. 25, 2001; Xilinx; WP152 (v1.0); pp. 1-2.*
Compaq's System Research Center, "Identifying and Filtering Near-Duplicate Documents," Andrei Z. Broder, Palo Alto, California, 1998; 10 pages.

(Continued)

*Primary Examiner* — Charles Kim
*Assistant Examiner* — Grace Park
(74) *Attorney, Agent, or Firm* — Charles Shemwell

(57) ABSTRACT

Redundant data is removed from a volume of data by partitioning the volume of data into fixed-length input segments and determining, for each of the input segments, whether a selected portion of the input segment matches a portion of a segment within a de-duplication dictionary. If the portion of the input segment matches a portion of the segment within the dictionary, the segment within the de-duplication dictionary is compared with the input segment and a token representative of the segment within the dictionary is substituted for at least part of the input segment determined to match the segment within the dictionary.

20 Claims, 7 Drawing Sheets

OTHER PUBLICATIONS

Fast '05: 4th Usenix Conference on File and Storage Techonologies, "TAPER: Tiered Approach for Eliminating Redundancy in Replica Synchronization," Navendu Jain, Mike Dahlin and Renu Tewari, Austin Texas, 2005; 14 pages.

IBM, "Redundancy Elimination Within Large Collections of Files," Purushottam Kulkarni, University of Massachusetts, Amherst, MA, Dec. 22. 2003, 15 pages.

MIT Laboratory for Computer Science and NYU Dept. of Computer Science, "A Low-bandwidth Network File System," Athicha Muthitacharoen et al., Banff, Alberta, Canada, 2001, 14 pages.

Sequences II: Methods in Communications, Security, and Computer Science, "Some Application of Rabin's Fingerprinting Method," Andrei Z. Broder, Palo Alto, California, 1993; 10 pages.

University of Arizona, Dept. of Computer Science, "Finding Similar Files in a Large File System," Udi Manber, Tucson, Arizona, Oct. 1993, 11 pages.

Usenix Association, "Proceedings of the General Track: 2004 Usenix Annual Technical Conference," Calicrates Policroniades and Ian Pratt, Boston, MA, 2004; 15 pages.

Benjamin Zhu et al., "Avoiding the Disk Bottleneck in the Data Domain Deduplication File System," FAST '08: 6th Usenix Conference on File and Storage Technologies, Usenix Association, San Jose CA, Feb. 29, 2008, pp. 269-282.

Navarro et al., "A Practical q-Gram Index for Text Retrieval Allowing Errors." CLEI Electronic Journal 1 (2), 1998, 16 pages.

Non-Final Office Action dated Feb. 21, 2012 in U.S. Appl. No. 12/754,537, 27 pages.

\* cited by examiner (Prior-Art)

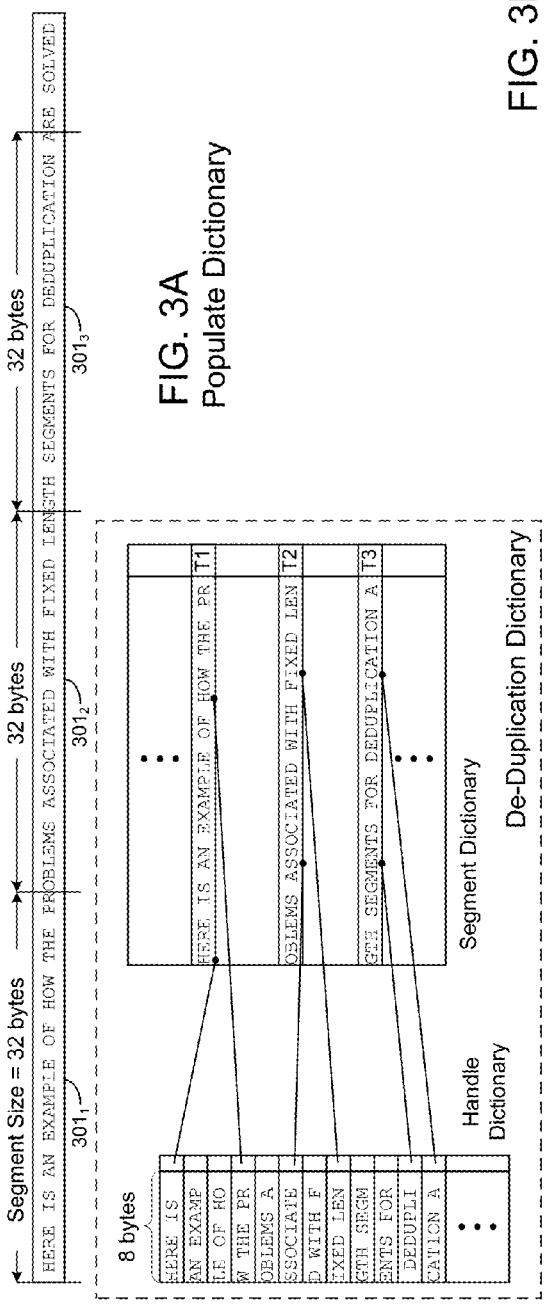
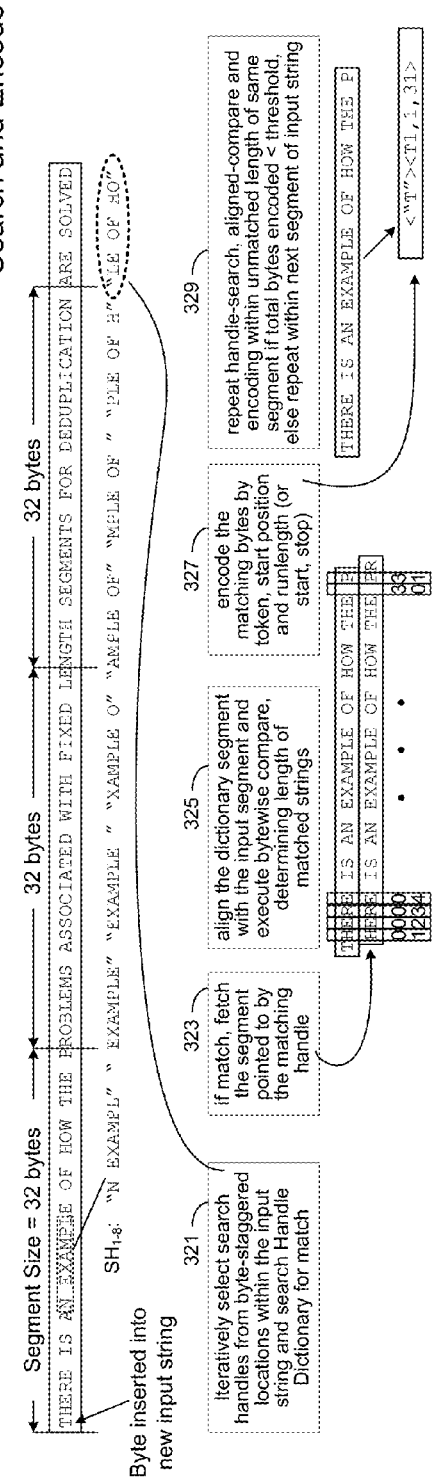
FIG. 3A Populate Dictionary
FIG. 3B Search and Encode

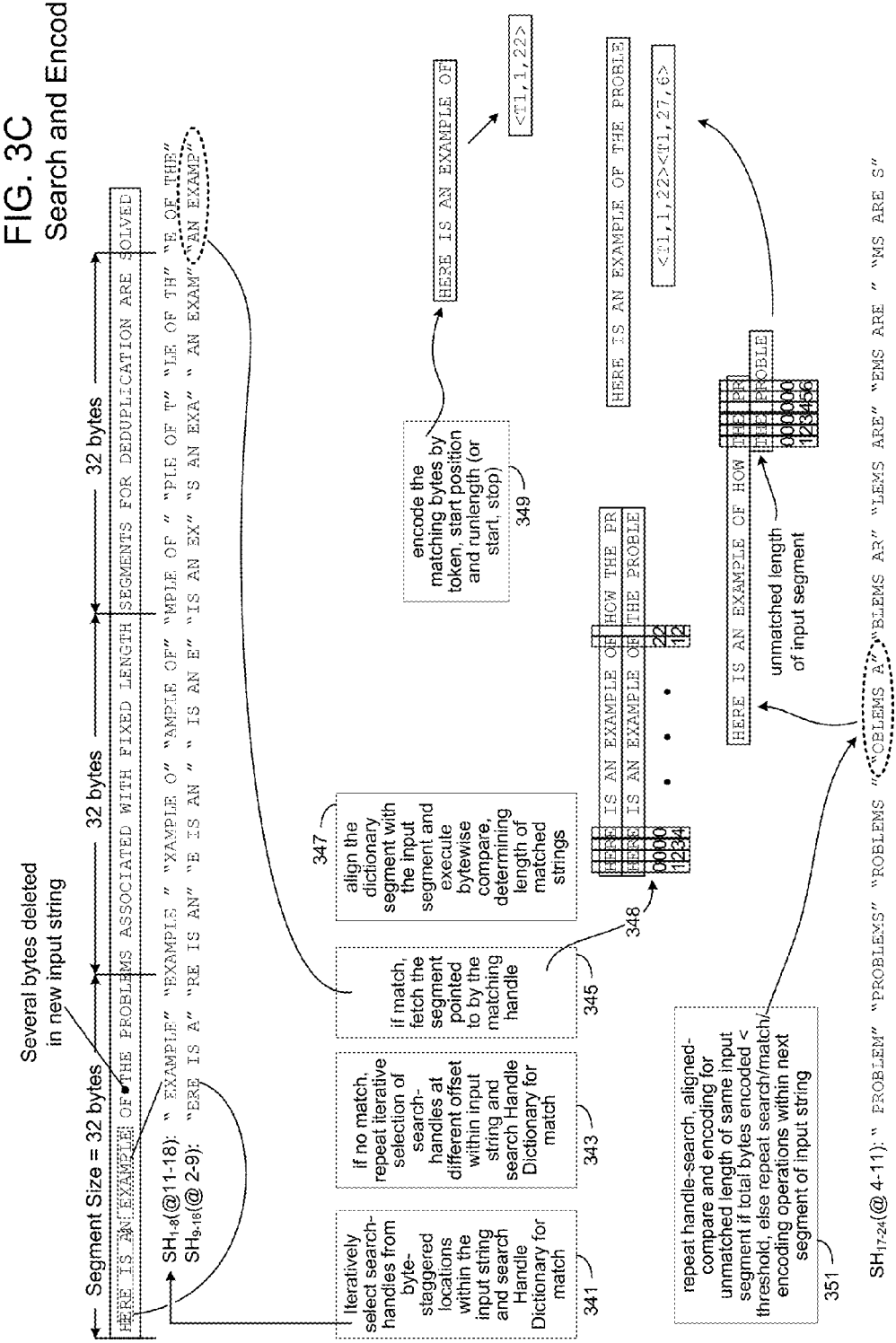
FIG. 3C Search and Encode

REVISION-TOLERANT DATA DE-DUPLICATION

PRIORITY CLAIM

This application hereby claims priority to and incorporates by reference U.S. Provisional Application No. 61/078,324, filed Jul. 3, 2008 and entitled "Highly Efficient Data Reduction." Additionally, this application hereby claims priority to U.S. Provisional Application No. 61/092,740, filed Aug. 28, 2008 and entitled "Storage Architecture for Dictionary-Based Data Reduction."

TECHNICAL FIELD

The disclosure herein relates to data processing and more particularly to reducing transfer and/or storage of redundant data in a data processing system.

BACKGROUND

The amount of data being stored and transmitted in modern data processing networks is growing rapidly as Web 2.0 technologies and content-rich media proliferate. Increasing employee mobility and rising capabilities of end user systems (e.g. laptops, smartphones) also increase the demand for content storage and transmission, as do disaster recovery and enterprise globalization technologies, which frequently involve distribution of multiple copies of data over large geographical areas. At the same time, the cost and operational expense of maintaining network links and large pools of storage devices remains high.

A number of technologies have emerged to address the explosive demand for network bandwidth and storage capacity, including data reduction techniques such as caching, compression and de-duplication. Data de-duplication is of particular interest and involves dictionary-based reduction of extremely large volumes of data (e.g., terabytes or more) into smaller quantities of stored or transmitted data.

FIG. 1 illustrates a prior-art de-duplication engine 100 that produces a de-duplicated output data volume, Y, in response to an input data volume, X. Following the conventional approach, breakpoints are identified within the input data volume based on the data content itself, thereby dividing the input data volume into multiple content-defined segments. A hash index is computed for each segment and compared with the contents of a hash table. If a matching hash index is found within the table, a dictionary segment pointed to by the matching hash table entry is retrieved and compared byte for byte with the input data segment. If the dictionary segment and input data segment match, then a token associated with the dictionary segment is inserted into the output data volume in place of the input data segment, thus reducing the output volume relative to the input volume (if the segments do not match or no matching hash index is found, the input data segment may be added to the dictionary and the corresponding hash index added to the hash table to effect a dictionary update). A converse operation is performed at the transmission destination (or upon retrieval from mass storage media), indexing the dictionary using the token (a matching dictionary is maintained at the destination) to restore the original data segment within a recovered data volume.

One substantial drawback of the foregoing de-duplication scheme is the intensive computation required to identify the breakpoints and hash index. In a typical implementation, a "fingerprint" is computed for each byte of the input data volume—a calculation that generally involves a polynomial division over a range of data extending from the byte of interest—to determine whether the subject byte constitutes a breakpoint (e.g., fingerprint meets some predetermined criteria, such as '0's in some number of bit positions). The hash index computation is similarly carried out for each byte of the input data volume and may similarly involve a relatively compute-intensive calculation. In general, the breakpoint identification and hash index computation are so demanding as to render the de-duplication operation impractical for high-bandwidth streaming data, thus requiring the data de-duplication operation to be executed offline for many important classes of applications.

The conventional approach is further plagued by dictionary "misses" that result from minor data modifications. Changing even a single byte within a segment will generally yield an entirely different hash index and thus a miss within the hash table (or worse, a hit within the hash table followed by a miss in the bytewise compare). Even more problematic is a modification within the region that produced a breakpoint in the original input data volume as the resulting breakpoint loss will cause a dictionary miss for both of the segments previously delineated by the breakpoint (i.e., one segment ended by the breakpoint and another segment begun).

BRIEF DESCRIPTION OF THE DRAWINGS

The disclosure herein is illustrated by way of example, and not by way of limitation, in the figures of the accompanying drawings and in which like reference numerals refer to similar elements and in which:

FIGS. 3A-3C illustrate operation of a revision-tolerant de-duplication engine in the context of a specific example;

DETAILED DESCRIPTION

Data de-duplication techniques that detect and account for positionally shifted content resulting from data insertion and deletion and thereby enable efficient data-de-duplication without requiring computationally-intensive content-based data segmentation are disclosed in various embodiments. In particular, by detecting and accounting for positionally shifted content, it becomes possible to apply content-independent segmentation (partitioning) of an input data volume, entirely avoiding the intensive computation of content-based breakpoints employed by prior-art techniques and thereby enabling on-demand de-duplication within streaming media and other important applications. Further, because dictionary hits may be detected even in the face of insertions and deletions, improved data reduction may be achieved.

Figure 1:
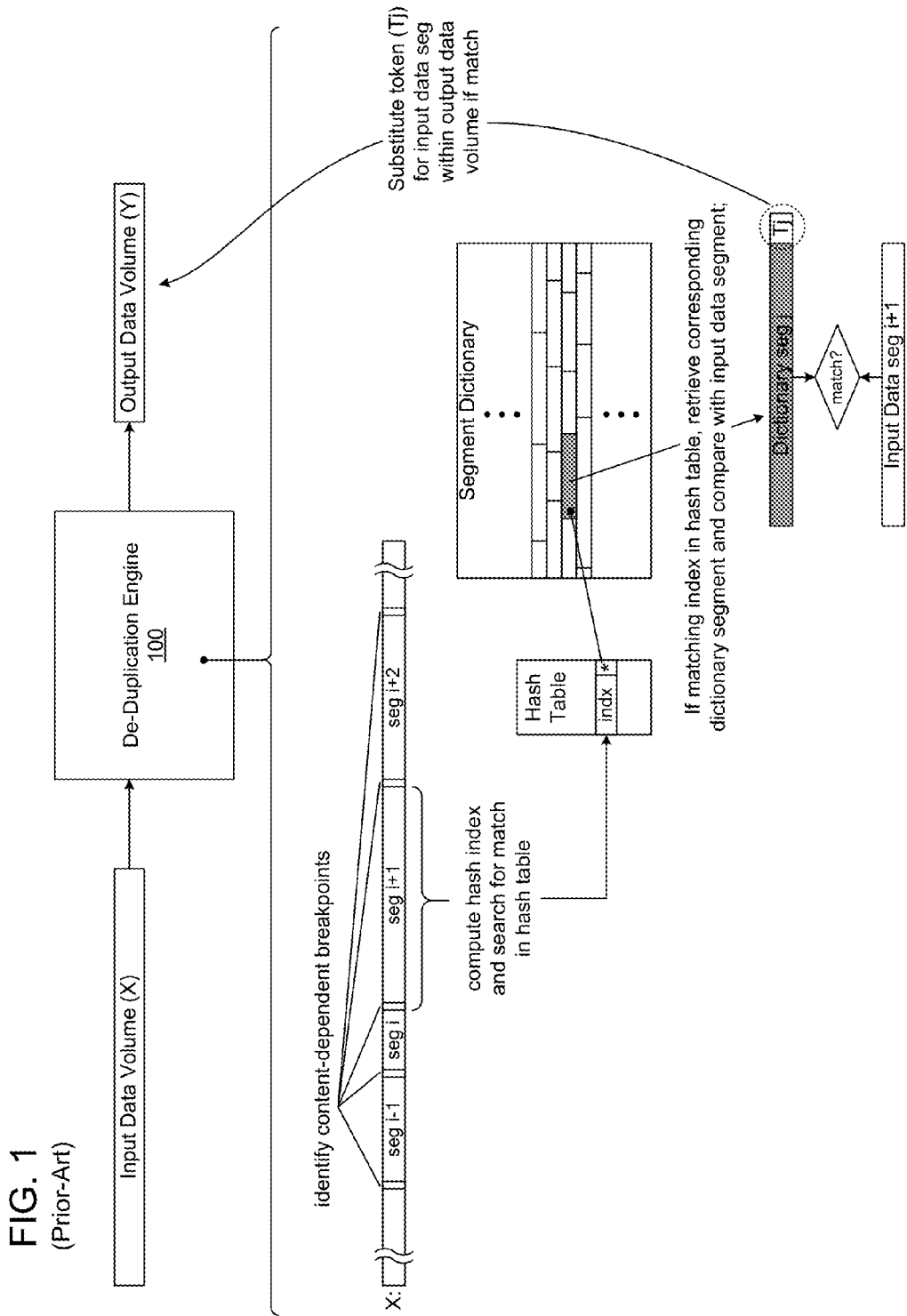
FIG. 1 illustrates a prior-art de-duplication engine.
Figure 2:
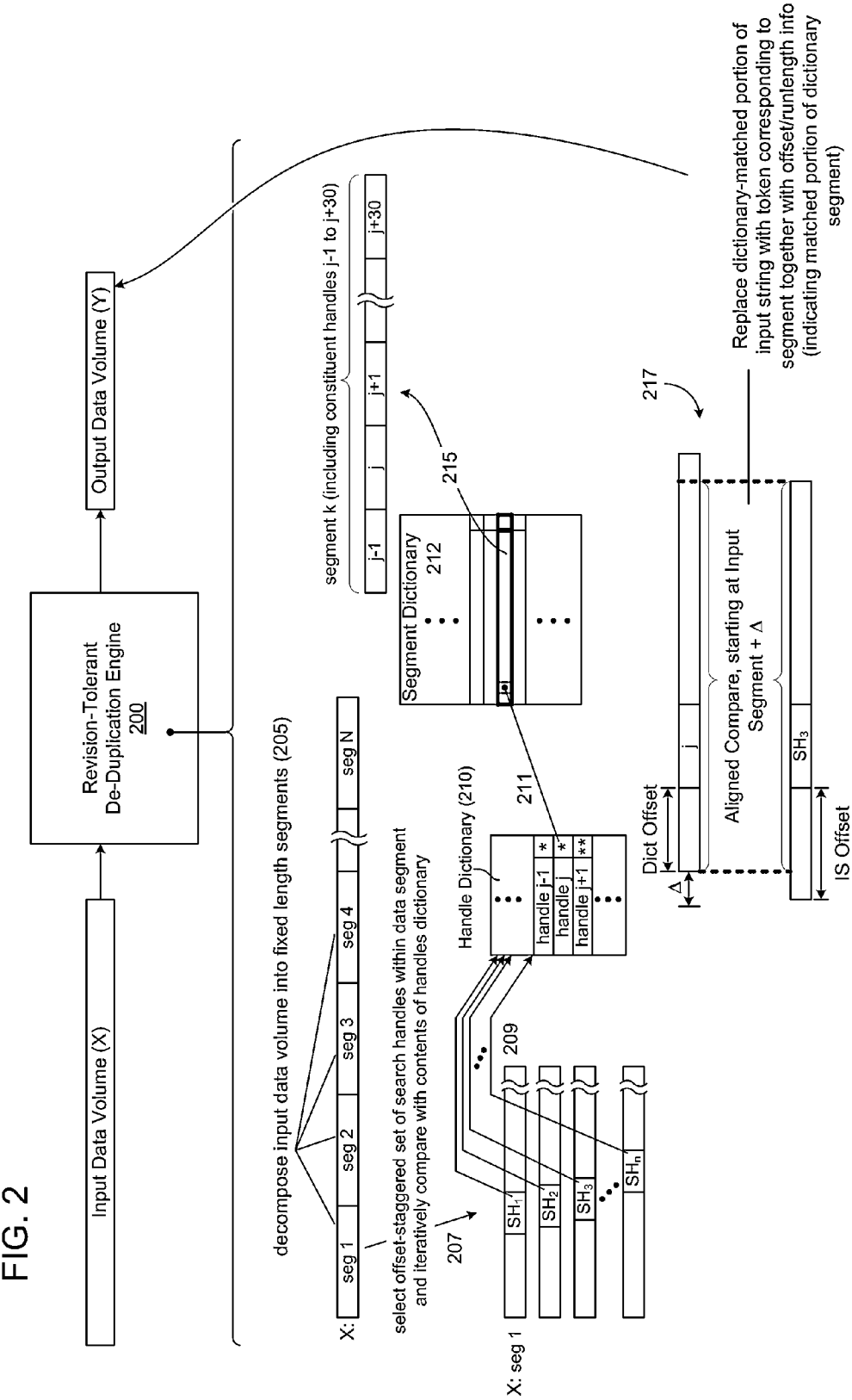
FIG. 2 illustrates an embodiment of a revision-tolerant de-duplication engine.

FIG. 2 illustrates an embodiment of a revision-tolerant de-duplication engine 200 that may be employed within a network appliance, data storage system or any other system that may benefit from reduced transfer or storage of redundant data. In the embodiment shown, the de-duplication engine 200 decomposes an input data volume X into fixed-length segments as shown at 205 and then carries out dictionary-based, revision-tolerant de-duplication with respect to each segment to produce a reduced-size output volume, Y. To enable this operation, the de-duplication engine first populates a two-part de-duplication dictionary with the contents of cold segments (i.e., segments that yield dictionary "misses"), storing each cold segment in a segment dictionary 212 (a first component of the de-duplication dictionary) and storing pointers to fixed-length subsegments of the cold segment in a segment-lookup dictionary 210. The fixed-length subsegments are referred to herein as handles and thus the segment-lookup dictionary referred to as a handle dictionary 210. In one embodiment, each handle is stored within the handle dictionary along with a pointer to each instance of that handle within the segment dictionary as shown at 211. Alternatively, instead of storing the handle itself within the handle dictionary, a hash value that may be deterministically computed from the handle may be stored within the handle dictionary along with the pointer(s) to the actual instances of the handle within the segment dictionary.

In either case, to search the dictionary for a given segment of input data volume X (also referred to herein as an input string), the de-duplication engine 200 selects an offset-staggered set of search handles within the data segment as shown at 207 and compares each search handle in turn (i.e., iteratively compares the search handles) with the contents of the handle dictionary (shown at 209) until either a matching handle is detected or all the search-handles are determined to miss (i.e., have no match within) the handle dictionary. In the specific example shown in FIG. 2, search handles, $SH_1$-$SH_n$, are retrieved from progressively incremented byte offsets within the first segment of the input data volume (i.e., byte-offset-staggered search handles) and compared with the contents of the handle dictionary 210 until a match is detected; in this example, a match for search handle, $SH_3$. The de-duplication engine 200 then references the pointer associated with the matching handle-dictionary entry (pointer '*' for handle j in this example as indicated by the shaded handle entry) to retrieve a dictionary segment (i.e., data segment from the segment dictionary) containing the search handle. For purposes of illustration, the retrieved segment 215 is assumed to contain 32 handles shown by handle indices j−1 to j+30, and the pointer itself is structured to include (or enable determination of) of the base address of the segment and the offset of the matching handle (handle j) within the retrieved dictionary segment. Because the offset of the matching handle within the dictionary segment is known (or determinable), and the offset of the search handle within the input data segment is also known (i.e., search handle $SH_3$ is offset by the starting offset of initial search handle, $SH_1$, plus the offset between $SH_3$ and $SH_1$—the starting offset of $SH_{1+2}$), the two segments may be bytewise aligned according to the difference between their offsets. That is, even if a data insertion has occurred at the beginning of the input data segment (or in a preceding segment) in a manner that results in a positional shift, the offset-staggered handle search will not only enable detection of matching portions of the input segment and a corresponding dictionary segment, but will enable determination of the relative offsets between those matching portions and their respective segment-start locations. Consequently, the misalignment between the input segment and dictionary segment ($\Delta$) may be used to enable an aligned comparison of the two segments—a bytewise comparison of the segment contents starting at an offset within one of the segments that accounts for the misalignment between their matching handles. This operation is illustrated at 217 by the comparison of the overlapping portions of the segments after being aligned by their handles. Note that a number of bytes (i.e., those not included within the overlapping region) are excluded from the comparison according to the handle misalignment value, $\Delta$, at either end of the two segments. Further, in one embodiment, the de-duplication engine not only determines whether all the bytes of the overlapping portions of the segments match, but the specific number of matching bytes, thereby enabling an encoding and data reduction even in the event that the two overlapping segments only partially match. As discussed below, the approach described thus far may be applied recursively (potentially using progressively smaller handles) to encode multiple discontiguous matching portions of the input segment and one or more dictionary segments. Upon concluding the comparison operation at 217, the de-duplication engine encodes the match by inserting, within the output data volume, a token representative of the dictionary segment and information identifying the specific portion of the dictionary segment determined to match all or part of the input segment in place of the matched (and therefore redundant) portion of the input string. A converse operation may be applied within a recipient system (or upon data retrieval) to restore the original data in response to the segment-specifying token and segment portion identifier.

FIGS. 3A-3C illustrate operation of a revision-tolerant de-duplication engine in the context of a specific example. More specifically, FIG. 3A illustrates population of a two-part de-duplication dictionary in response to a sequence of cold segments within an exemplary input data string, while FIGS. 3B and 3C illustrate encoding operations that apply the populated dictionary. For purposes of example only, individual data elements and offsets therebetween are assumed to exhibit byte granularity and the segment size and handle size are assumed to be 32 bytes and 8 bytes, respectively. In practice, larger segment and handle sizes are generally applied. For example, in one embodiment, the segment size is set to 1 kilobyte and handle size to 32 bytes. More generally, any practical segment size and handle size may be applied and such sizes may be predetermined, operator-specified (e.g., through configuration settings within an appliance or programmable device) or adaptively/heuristically determined based on data content or other information available during system operation. Similarly, instead of byte granularity and/or offsets, word granularity/offsets of any number of bits may be used. Also, while text-based examples are shown in FIGS. 3A-3C, this is for ease of understanding only. The approach described is equally applicable to unconstrained binary data.

Turning to FIG. 3A, the following input string is received and decomposed into a sequence of 32-byte segments $301_1$-$301_3$ which are stored in the segment dictionary:

HERE IS AN EXAMPLE OF HOW THE PROBLEMS ASSOCIATED WITH FIXED LENGTH SEGMENTS FOR DEDUPLICATION ARE SOLVED

Thereafter, each segment within the segment dictionary is decomposed into four 8-byte handles and the handles (or a hash index corresponding to same) are stored in the handle dictionary along with a pointer to the corresponding handle within the segment dictionary. Thus, for the three complete 32 byte segments of the input string, twelve corresponding handles and handle pointers are stored within the handle dictionary. Note that while the dictionary dictionary, this may not be the case in ordinary practice. Also, each of the handles may additionally point to one or more other segments within the segment dictionary (e.g., handle pointer implemented as linked list of pointers to segments that contain the same matching handle).

FIG. 3B illustrates an exemplary application of the now populated de-duplication dictionary to encode an input string. In this particular example, the input string matches the string used to populate the dictionary (i.e., the recorded string), except that a new byte "T" has been inserted at the beginning of the string, thus yielding a positional displacement (shift) that changes the net content of every segment relative to the segments of the recorded string. As this example makes clear, hashed segment by segment comparison as used in prior-art approaches would yield a miss in every segment, despite the relatively minor revision to the data (hence the rejection of content-independent partitioning in conventional de-duplication methodologies).

Starting with the first incoming segment ("THERE IS AN EXAMPLE OF HOW THE P"), the de-duplication engine iteratively selects search handles from byte-staggered locations within the segment and searches the handle dictionary for a match (321). In this case, a relatively centered position within the input segment is selected (i.e., (segment length–handle length)/2−1=11) as the starting byte offset and a number of byte-staggered search handles corresponding to the handle length (i.e., 8 search handles) are selected starting from byte positions 11 ("N EXAMPL"), 12 ("EXAMPLE"), 13 ("EXAMPLE"), 14 ("XAMPLE O"), 15("AMPLE OF"), 16 ("MPLE OF"), 17 ("PLE OF H") and 18 ("LE OF HO") and compared with the contents of the handle dictionary. As discussed above, a hash index may be computed for each search handle and compared with a like-computed index stored within the handle dictionary, instead of populating the handle dictionary with complete handles as shown in FIG. 3A.

Continuing with the de-duplication shown in FIG. 3B, of the eight search handles, the last one "LE OF HO", is found in the handle dictionary. Accordingly, as shown at 323, the segment pointed to by the matching handle ("HERE IS AN EXAMPLE OF HOW THE PR") is retrieved from the segment dictionary. The dictionary segment and input segment are aligned based on the difference between the offset of the matching search handle within the input segment and the dictionary segment. That is, "LE OF HO" occurs at position 18 within the input segment (a value immediately available to the de-duplication engine as the starting position, 11, plus search handle number, 8, minus one) and at position 17 within the dictionary segment (handle pointer-base segment pointer), so that a handle misalignment of +1 is determined. Accordingly, as shown at 325, an aligned comparison may be carried out by comparing each byte of the dictionary segment up to segment length minus handle-misalignment value (1 in this example) with each byte of the input segment starting at one byte past the misalignment value. That is, bytes 1-31 of the dictionary segment are compared with bytes 2-32 of the input string. In the case of a negative misalignment value, application of the misalignment value to the beginning and end of the input segment and dictionary segment is reversed.

Continuing, in the example of FIG. 3B, all compared bytes of the handle-aligned segments match. Accordingly, as shown at 327, the matching bytes may be encoded by the token of the dictionary segment, and information indicating the sequence of contiguous matching bytes. In the embodiment shown, for example, the dictionary segment may be represented by token T1 (a much smaller unit of data than the data segment itself), start position 1 and run-length value 31 (note that start position and stop position may alternatively be used to encode the length of the matching byte sequence). Overall, the input segment is encoded by the unmatched string portion resulting from the misalignment, or <"T"> in this example), and the segment portion encoding, <T1, 1, 31>, and thus may be replaced in the output data volume by <"T"><T1,1,31>. At this point, as shown at 329, the entire handle-search, aligned-compare and encoding may be executed for the next input segment or, in the event that the total number of unmatched bytes in the current segment is less than a predetermined (or programmed or adaptively determined) threshold, another handle-search, aligned-compare and encoding may be carried out with respect to the unmatched portion of the current segment.

FIG. 3C illustrates another exemplary encoding of an input string using the de-duplication dictionary of FIG. 3A. In this particular example, the input string matches the recorded string except that string portion "HOW" has been deleted, yielding a positional displacement (shift) that changes the net content of every segment relative to the segments of the recorded string. Again, hashed segment by segment comparison as used in prior-art approaches would yield a miss in every segment, despite the relatively minor revision to the data.

Starting with the first incoming segment ("HERE IS AN EXAMPLE OF THE PROBLE"), the de-duplication engine iteratively selects search handles from byte-staggered locations within the segment and searches the handle dictionary for a match (341). Again, a relatively centered position within the input segment is initially selected (i.e., (segment length–handle length)/2−1=11) as the handle-search anchor (i.e., starting byte offset) and a number of byte-staggered search handles corresponding to the handle length (i.e., 8 search handles) are thus selected starting from byte positions 11 ("EXAMPLE"), 12 ("EXAMPLE"), 13 ("XAMPLE O"), 14 ("AMPLE OF"), 15 ("MPLE OF"), 16 ("PLE OF T"), 17 ("LE OF TH") and 18 ("E OF THE") and compared with the contents of the handle dictionary. In this case, none of the eight search handles finds a match in the handle dictionary. Accordingly, in the embodiment shown, the offset-staggered handle search is repeated at 343 starting at a different handle-search anchor within input segment; in this case toward the start of the input segment at position 2 (note that any progression to any number of different handle-search anchors may be used, including operator-programmed or adaptively determined progressions or a purely randomly-generated sequence of positions). Using the new anchor, search handles are selected starting from the anchor byte position: 2 ("ERE IS A"), 3 ("RE IS AN"), 4 ("E IS AN"), 5 ("IS AN E"), 6 ("IS AN EX"), 7 ("S AN EXA"), 8 ("AN EXAM") and 9 ("AN EXAMP"). Of these, the last one "AN EXAMP", matches a handle in the handle dictionary (or yields a hash index that matches a hash index in the handle dictionary). Accordingly, the segment pointed to by the handle dictionary entry is retrieved as shown at 345 and an aligned comparison carried out as shown at 347. In this case, the handle misalignment is zero as the matched handle occurs at the same byte offset (9) within the input segment and dictionary segment. Accordingly, the aligned comparison is carried out starting at the first byte of both segments. As shown at 348, the segments are determined to match through byte position 22, and to mismatch in byte position 23 ("H" not equal to "T"). Because of the provision of run-length information in the segment encoding, the matching portions of the segments may be encoded and used to effect data reduction even though the two segments do not entirely match (contrast prior art approaches in which only whole-segment matches are encoded). Accordingly, the matching byte sequence is encoded at 349 as <T1, 1, 22> (i.e., first 22 bytes of segment corresponding to token T1) and substituted (within the output data volume) for the first 22 bytes of the input segment.

Continuing with FIG. 3C, the number of unmatched bytes of the input string is determined to exceed a threshold that results in an iterative de-duplication effort at 351. In this iteration, the ten contiguous unmatched bytes of the input string are used as the input source and a handle-search is carried out starting at a relative midpoint offset 4 (e.g., handle search anchor determined by dividing the search byte count by two, minus one). Note that the search handle size remains unchanged despite the smaller input source. In alternative embodiments, the handle size may be reduced or scaled according to input source size.

Continuing with the example of FIG. 3C, one of the search handles ("OBLEMS A") matches a handle within the handle dictionary and is thus used to retrieve the corresponding dictionary segment. The handle misalignment value (offset of input source within original input string+difference between offsets of the matching handle within the input source and dictionary segment; −27 in this example) is used to carry out an aligned compare. The resulting match of the input source bytes and the last six bytes of the dictionary segment may thus be encoded as <T1, 27, 6> to indicate that the bytes "THE PR" are found in token T1 starting at byte offset 27 and continuing for six bytes. The overall encoding of the input segment with respect to the dictionary segment, T1, is thus <T1, 1, 22><T1, 27, 6>, "OBLE". The final bytes may subsequently be encoded as <T2, 1, 4>.

Figure 4:
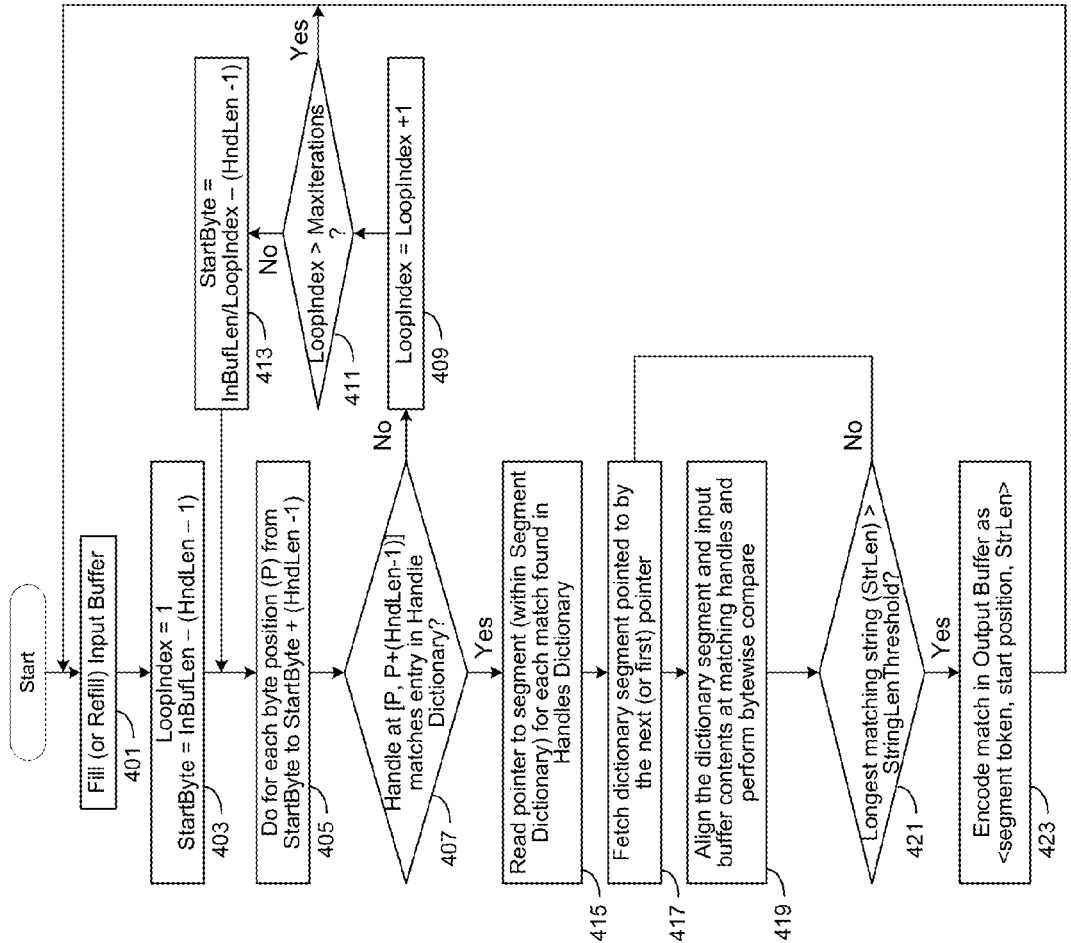
FIG. 4 illustrates a generalized flow diagram for the revision-tolerant data de-duplication described above.

FIG. 4 illustrates a generalized flow diagram for the revision-tolerant data de-duplication described above. Starting at 401, an input buffer is filled or refilled with the next fixed length segment to be de-duplicated, and at 403 a loop index (LoopIndex) is initialized to one and a startbyte index (i.e., search-handle anchor) is assigned to the end of the input buffer (InBufLen) less the handle length (HndLen) minus 1, thus providing headroom for advancing the search handle forward by one byte in as many as HndLen number of handle search operations.

At 405, a handle-search loop is started, starting with a search handle anchored at start byte and progressing in each loop iteration by one byte (up to StartByte+HndLen-1). Within the body of the loop, starting at decision 407, the search handle (i.e., handle at [P, P+HndLen−1]) is compared with the contents of the unmatched portion of the dictionary segment. If no match is detected (determined at 407), the loop index is incremented at 409 and checked against a maximum iteration value at 411. If the loop index does not exceed the maximum iteration value, the loop is repeated at 405 after setting a new StartByte value in 413. In the example shown, the StartByte value is assigned a value equal to the input buffer length divided by the loop index (less handle length minus 1 to provide headroom for the offset staggered handle-search); a heuristic that moves the StartByte progressively closer to the start of the input buffer in each loop iteration. Other approaches for adjusting the StartByte location may be used in alternative embodiments.

Returning to decision 411, if the loop index is determined to exceed the max iteration value, then the input buffer refilled at 401 and the sequence operations described thus far is repeated for the new input buffer content. Though not shown, prior to refilling the buffer at 401, the current buffer content may be used to populate the de-duplication dictionary (i.e., a dictionary miss has occurred) and inserted verbatim within the output data volume. Also, other types of encoding may be applied to reduce the buffer content prior to insertion within the output data volume.

Returning to decision 407, if the search handle matches one or more entries in the handle dictionary, the pointers for each matching entry are read from the handle dictionary at 415. At 417, a segment fetch loop is begun to fetch each dictionary segment corresponding to a matching handle in turn. At 419, the fetched dictionary segment and input buffer contents (i.e., input segment) are aligned based on the relative positions at which the matched handle appears in each, and a bytewise compare is executed. At 421, the longest matching string (i.e., sequence of contiguous bytes or other data elements) is compared with a string length threshold (StrLenThreshold). If the longest matching string is greater than the string length threshold, then the match is encoded within the output buffer (i.e., storage for all or portion of output data volume) by a token that corresponds to the dictionary segment, starting offset within the dictionary segment and value that specifies or enables determination of the length of the string (e.g., <segment token, start byte, StrLen> as shown at 423). After encoding at 423, execution is repeated starting with refilling the input buffer at 401.

Returning to decision 421, if the longest matching string does not exceed the string length threshold (which may be a fixed, programmable or adaptively determined value), the matching string is deemed too short to encode and execution proceeds from the start of the loop at 417 to fetch the dictionary segment pointed to by the next matching handle dictionary entry, if any.

Figure 5:
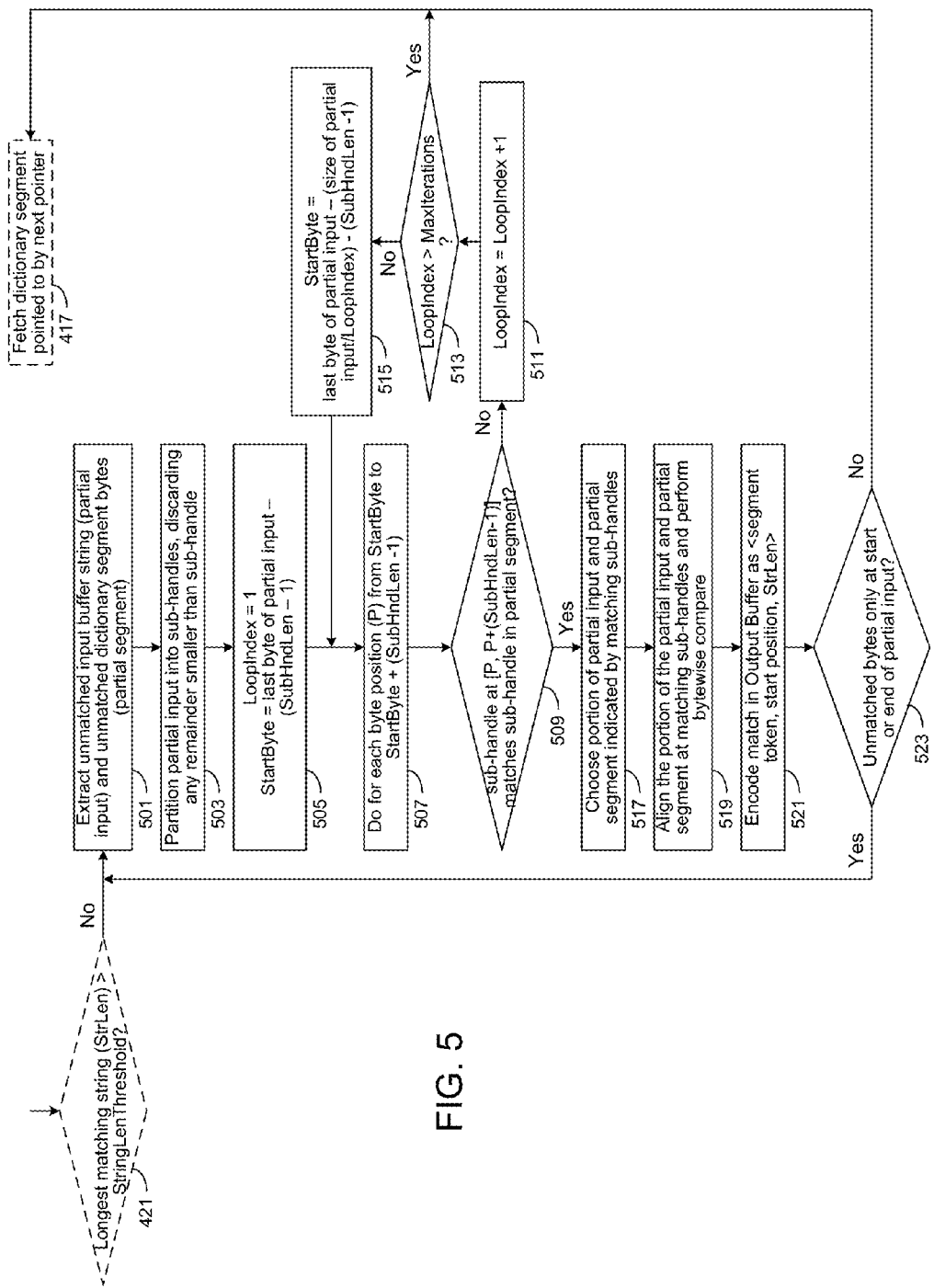
FIG. 5 illustrates an optional refinement of the generalized method shown by FIG. 4.

FIG. 5 illustrates an optional refinement of the generalized method shown by FIG. 4. More specifically, at decision 421, instead of returning directly to block 417 to fetch the next dictionary segment in response to a negative determination, a more refined search is carried out within the unmatched portion of the input buffer content. More specifically, at 501, the unmatched portion of the input buffer string (referred to herein as the partial input) and unmatched portion of the dictionary segment (the partial segment) are extracted from the input buffer and dictionary segment, respectively. At 503, the partial input is divided (or partitioned) into multiple sub-handles, discarding ay remainder smaller than the sub-handle size. In one embodiment, for example, the sub-handle size is half the size of the original handle (or half the size of the next larger handle in the case of a hierarchy of handle sizes). At 505, a loop index is initialized to 1 and a search handle anchor (StartByte) set to the final byte of the partial input less the sub-handle size minus 1.

At 507, a search loop is begun to execute a sequence of offset-staggered sub-handle searches starting with the sub-handle at the handle anchor (StartByte) and advancing the sub-handle by one byte in each loop iteration. More specifically, each sub-handle is (i.e., sequence of sub-handles at [P, P+SubHndLen−1] where P is advanced by one byte SubHndLen number of times) is compared with the contents of the handle dictionary. If no match is detected (decision 509), the loop index is incremented at 511 and checked against a maximum iteration value at 513. If the loop index does not exceed the maximum iteration value, the loop is repeated at 507 after setting a new StartByte value in block 515. In the example shown, the StartByte value is offset from the end of the partial input by a number of bytes equal to the size of the partial input divided by the loop index (and less handle length minus 1 to provide headroom for the offset staggered subhandle-search), thus moving the StartByte progressively closer to the start of the partial input in each loop iteration. Other approaches for adjusting the StartByte location may be used in alternative embodiments. If the loop index is determined to exceed the max iteration value at 513, then execution proceeds to block 417 to fetch the dictionary segment pointed to by the pointer for the next matching entry in the handle dictionary, if any.

Returning to decision 509, if the sub-handle matches one or more sub-handles in the unmatched portion of the dictionary segment, the portions of the partial input and partial segment indicated by the matching sub-handles are selected at block 517 and an aligned compare executed at 519. That is, the portions of the partial input and partial segment are aligned at their matching subhandle and the overlapping region of each compared in a bytewise compare. A matching string, if any, is encoded and inserted within the output buffer as <segment token, start position, StrLen> as shown at 521. Finally, if the unmatched bytes are determined to occur only at the start or end of the partial input (determined in decision 523), then yet more unmatched bytes remain. In that case the refined search operation is repeated, starting at block 501 by extracting the remaining unmatched bytes from the input buffer string and dictionary segment. If the remaining unmatched bytes are not limited to the start or end of the partial input (negative determination at 523), then the next segment may be fetched at 417, or the input buffer reloaded at the top of the de-duplication loop.

It should be noted that the data de-duplication techniques disclosed herein are not restricted to segments of fixed length. Even when an alternate mechanism is used to determine the boundaries of segments in an input (using, for example, the fingerprint-based approaches in prior art), this method is equally applicable. In one embodiment, each variable length segment so determined can be further segmented into fixed length segments and each such fixed length segment is stored in the segment dictionary, with the corresponding handle dictionary. Then the handle search mechanism described in this invention is utilized within the variable length segment to identify pointers to the fixed length segments in the dictionary. These fixed length segments are fetched and then compared to the contents of the variable length segment by applying the alignment discussed above and the rest of the process carries over. One major specific advantage of this approach over the prior art on variable length segments is that partial matches can now be identified and more effective data de-duplication can thus be accomplished, in contrast to the prior art where an input segment either matches in its entirety with a dictionary segment or otherwise considered to have no match at all.

With respect to FIGS. 4 and 5 in particular, it should be noted that numerous alternative implementations and application-specific optimizations may be implemented without departing from the intended scope of the approach described. For example, multiple fixed-length segments (or a whole segment and a fraction of another) may be loaded into the input buffer instead of one segment at a time. In one embodiment, for example, approximately two full segments are retrieved and moved through the input buffer in pipelined fashion (i.e., each refilling of the buffer moves segment i into the buffer location previously occupied by segment i−1, and moves segment i+1 into the buffer location previously occupied by segment i). By this operation, a number of bytes of a subsequent segment may be encoded as part of a preceding segment. As another example, progressively smaller subhandles may be used to effect a hierarchical handle search as the unmatched portion of a given input segment becomes progressively smaller. These and other changes are deemed to be entirely within the scope of the generally described embodiments.

Figure 6:
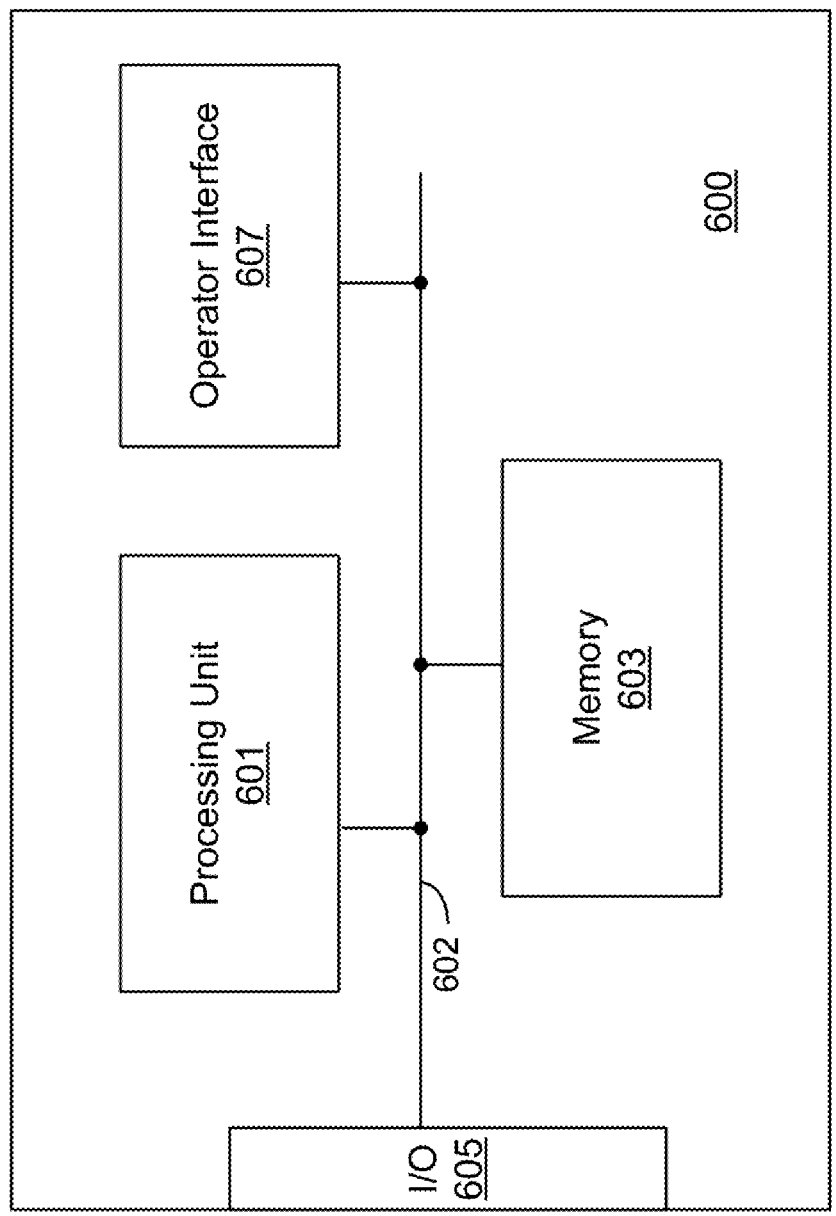
FIG. 6 illustrates a generalized embodiment of an appliance (or system or device) for executing the de-duplication operations described above.

FIG. 6 illustrates a generalized embodiment of an appliance 600 (or system or device) for executing the de-duplication operations described above. As shown, the appliance 600 includes a processing unit 601 formed by one or more general purposes or special purpose processors, memory 603 for storing program code executed by the processing unit to effect the various methods and techniques of the above-described embodiments, and also to store the data streamed through the appliance (i.e., input and output data volumes or portions thereof).

The appliance further includes one or more input and/or output (I/O) ports 605 for receiving and outputting the data stream, and a user interface 607 to present and receive information to a human or artificial operator and thus enable operator control of the de-duplication function (e.g., set configuration, programmable values, etc.) as well as to interact with the appliance in a manner intended by its core function. Though not shown, numerous other functional blocks may be provided within the appliance according to its core function (and the appliance itself may be a component in a larger host appliance or network of appliances). Further, the functional blocks are depicted as being coupled by a communication path 602 which may include any number of shared or dedicated buses or signaling links More generally, the functional blocks shown may be interconnected in a variety of different architectures and individually be implemented by a variety of different underlying technologies and architectures. With regard to the memory architecture, for example, multiple different classes of storage may be provided within memory 603 to store different classes of data. For example, non-volatile storage media such as fixed or removable magnetic, optical, or semiconductor-based recording media may be provided to store executable code and related data (or receivable within such system to enable receipt of such executable code and related data), while volatile storage media such as static or dynamic RAM for storing variable data.

The various de-duplication methods and techniques disclosed herein may be implemented through execution of one or more a sequences of instructions (i.e., software program (s)) within the processing unit 601, or by a custom-built hardware ASIC (application-specific integrated circuit), or programmed on a programmable hardware device such as an FPGA (field-programmable gate array), or any combination thereof. If a purely hardware-based execution engine is provided, the processing unit 601 and related circuitry may be omitted from appliance 600.

Electronic Representation of Physical Embodiments

Any of the various methodologies disclosed herein and/or user interfaces for configuring and managing same may be implemented by machine execution of one or more sequences instructions (including related data necessary for proper instruction execution). Such instructions may be recorded on one or more computer-readable media for later retrieval and execution within one or more processors of a special purpose or general purpose computer system or consumer electronic device or appliance, such as the system, device or appliance described in reference to FIG. 6. Computer-readable media in which such instructions and data may be embodied include, but are not limited to, non-volatile storage media in various forms (e.g., optical, magnetic or semiconductor storage media) and carrier waves that may be used to transfer such instructions and data through wireless, optical, or wired signaling media or any combination thereof. Examples of transfers of such instructions and data by carrier waves include, but are not limited to, transfers (uploads, downloads, e-mail, etc.) over the Internet and/or other computer networks via one or more data transfer protocols (e.g., HTTP, FTP, SMTP, etc.).

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. In other instances, well-known circuits and devices are shown in block diagram form to avoid obscuring the present invention unnecessarily. Additionally, the interconnection between circuit elements or blocks may be shown as buses or as single signal lines. Each of the buses may alternatively be a single signal line, and each of the single signal lines may alternatively be buses. Signals and signaling paths shown or described as being single-ended may also be differential, and vice-versa. A signal driving circuit is said to "output" a signal to a signal receiving circuit when the signal driving circuit asserts (or deasserts, if explicitly stated or indicated by context) the signal on a signal line coupled between the signal driving and signal receiving circuits. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The terms "exemplary" and "embodiment" are used to express an example, not a preference or requirement.

While the invention has been described with reference to specific embodiments thereof, it will be evident that various modifications and changes may be made thereto without departing from the broader spirit and scope. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A method of de-duplicating a volume of data, the method comprising:
    selecting a plurality of overlapping portions of an input segment within the volume of data;
    comparing each of the overlapping portions of the input segment with a plurality of portions of a dictionary segment from a de-duplication dictionary to identify a first portion of the input segment that matches a first portion of the dictionary segment;
    after identifying the matching first portions of the input segment and dictionary segment, determining a starting position of selected bytes within the input segment that differs from a starting position of selected bytes within the dictionary segment according to a difference between starting positions of the matching first portions of the input segment and dictionary segment, the selected bytes of the input segment including more bytes than any one of the overlapping portions of the input segment;
    comparing the selected bytes of the input segment with the selected bytes of the dictionary segment to identify dictionary-matching bytes within the input segment; and
    replacing the dictionary-matching bytes within the input segment with a token representative of the dictionary segment to reduce the size of the volume of data.

2. The method of claim 1 further comprising partitioning the volume of data into a plurality of segments, the input segment being one of the plurality of segments.

3. The method of claim 1 wherein the portions of the input segment have equal lengths.

4. The method of claim 1 wherein selecting the plurality of overlapping portions of the input segment comprises selecting the plurality of portions of the input segment from respective starting positions within the input segment offset from one another in uniform steps.

5. The method of claim 4 wherein selecting the plurality of portions of the input segment from respective starting positions within the input segment offset from one another in uniform steps comprises selecting the plurality of portions of the input segment from byte-staggered starting positions within the input segment.

6. The method of claim 1 further comprising loading a segment dictionary of the de-duplication dictionary with a plurality of segments obtained from one or more previously received volumes of data, and loading a handle dictionary of the de-duplication dictionary with values that correspond to component portions of the plurality of segments loaded into the segment dictionary, and wherein the plurality of segments loaded into the segment dictionary includes the dictionary segment, and wherein comparing each of the plurality of overlapping portions of the input segment with the plurality of portions of the dictionary segment comprises comparing each of the plurality of portions of the input segment with the contents of the handle dictionary.

7. The method of claim 6 wherein the values that correspond to the component portions are hash values determined based at least in part on the corresponding component portions.

8. The method of claim 6 further comprising loading the handle dictionary with a pointer that indicates, for each value loaded into the handle dictionary, which of the plurality of segments loaded into the segment dictionary contains the component value to which the value in the handle dictionary corresponds and an offset within the segment in the segment dictionary at which the component value is located.

9. The method of claim 1 wherein replacing the dictionary-matching bytes with a token representative of the dictionary segment comprises determining a contiguous sequence of bytes within the selected bytes of the input segment that match a corresponding sequence of bytes within the selected bytes of the dictionary segment, and substituting, for the contiguous sequence of bytes, the token representative of the dictionary segment together with information that indicates the number of bytes within the contiguous sequence of bytes.

10. The method of claim 1 wherein replacing the dictionary-matching bytes within the input segment with a token representative of the dictionary segment comprises determining a contiguous sequence of bytes within selected bytes of the input segment that match a corresponding sequence of bytes within the selected bytes of the dictionary segment, and substituting, for the contiguous sequence of bytes, the token representative of the dictionary segment together with information that indicates the number of bytes within the contiguous sequence of bytes determined to match corresponding bytes within the dictionary segment, and information that indicates a starting position of the corresponding bytes within the dictionary segment.

11. The method of claim 1 further comprising determining whether the dictionary-matching bytes within the input segment exceeds a threshold number of bytes, and wherein replacing the dictionary-matching bytes within the input segment with a token representative of the dictionary segment comprises substituting the token representative of the dictionary segment for the dictionary-matching bytes if the number of dictionary-matching bytes exceeds the threshold number of bytes.

12. The method of claim 1 further comprising repeating said acts of comparing each of a plurality of overlapping portions, comparing selected bytes and replacing with a token representative of the dictionary segment with respect to a portion of the input segment that does not include the dictionary-matching bytes.

13. The method of claim 1 further comprising obtaining a further input segment from the volume of data and repeating, with respect to the further input segment, said acts of comparing each of a plurality of overlapping portions, comparing selected bytes and replacing with a token representative of the dictionary segment.

14. The method of claim 13 wherein repeating, with respect to the further input segment, said acts of comparing each a plurality of overlapping portions, comparing selected bytes comprises repeating said acts of comparing each a plurality of overlapping portions and comparing selected bytes using a smaller selected portion of the input segment than in preceding acts of comparing each a plurality of overlapping portions and comparing selected bytes.

15. The method of claim 1 wherein selecting the plurality of overlapping portions and comparing each of the overlapping portions comprises comparing a first one of the overlapping portions with the plurality of portions of the dictionary segment before selecting a second one of the overlapping portions.

16. A method of de-duplicating a volume of data, the method comprising:
    partitioning the volume of data into a plurality of segments based on content within the volume of data;
    selecting a plurality of overlapping portions of an input segment of the plurality of segments;
    comparing each of the overlapping portions of the input segment with a plurality of portions of a dictionary segment from a de-duplication dictionary to identify a first portion of the input segment that matches a first portion of the dictionary segment;
    after identifying the matching first portions of the input segment and dictionary segment, determining a starting position of selected bytes within the input segment that differs from a starting position of selected bytes within the dictionary segment according to a difference between starting positions of the matching first portions of the input segment and dictionary segment, the selected bytes of the input segment including more bytes than any one of the overlapping portions of the input segment;
    comparing the selected bytes of the input segment with the selected bytes of the dictionary segment to identify dictionary-matching bytes within the input segment; and
    replacing the dictionary-matching bytes within the input segment with a token representative of the dictionary segment to reduce the size of the volume of data.

17. The method of claim 16 wherein partitioning the volume of data into segments based on data content within the volume of data comprises:
    computing a fingerprint based on the data content within a selected range of locations within the volume of data;
    determining whether the fingerprint meets a predetermined criteria; and
    selecting a predetermined location relative to the start of the selected range of locations to be a breakpoint if the fingerprint meets the predetermined criteria, wherein the breakpoint defines, along with one other such like-determined breakpoints, the segments of the volume of data.

18. The method of claim 16 wherein partitioning the volume of data into segments based on data content within the volume of data comprises partitioning the volume of data into variable-length segments.

19. The method of claim 16 wherein the portions of the input segment have equal lengths.

20. A non-transitory computer-readable medium having one or more sequences of instructions embodied therein which, when executed by a processing unit, cause the processing unit to:
    select a plurality of overlapping portions of an input segment within a volume of data;
    compare each of the overlapping portions of the input segment with a plurality of portions of a dictionary segment from a de-duplication dictionary identify a first portion of the input segment that matches a first portion of the dictionary segment;
    determine a starting position of selected bytes within the input segment that differs from a starting position of selected bytes within the dictionary segment according to a difference between starting positions of the matching first portions of the input segment and dictionary segment, the selected bytes of the input segment including more bytes than any one of the overlapping portions of the input segment;
    compare the selected bytes of the input segment with the selected bytes of the dictionary segment to identify dictionary-matching bytes within the input segment; and
    replace the dictionary-matching bytes within the input segment with a token representative of the dictionary segment to reduce the size of the volume of data.

* * * * *